United States Patent
Ferryman et al.

(10) Patent No.: US 9,140,363 B2
(45) Date of Patent: Sep. 22, 2015

(54) BRUSH SEAL COVER ASSEMBLY

(75) Inventors: Roger Ferryman, Moseley, VA (US);
Patrick Fitzgerald, Richmond, VA (US); David Chrisman, Sandston, VA (US); Pavan Kumar Ravulaparthy, Glen Allen, VA (US)

(73) Assignee: Sealeze, A Unit of Jason Inc., Richmond, VA (US)

( * ) Notice: Subject to any disclaimer, the term of this patent is extended or adjusted under 35 U.S.C. 154(b) by 50 days.

(21) Appl. No.: 13/823,865

(22) PCT Filed: Jun. 7, 2012

(86) PCT No.: PCT/US2012/041439
§ 371 (c)(1),
(2), (4) Date: Mar. 15, 2013

(87) PCT Pub. No.: WO2012/170750
PCT Pub. Date: Dec. 13, 2012

(65) Prior Publication Data
US 2013/0167685 A1 Jul. 4, 2013

Related U.S. Application Data

(60) Provisional application No. 61/494,406, filed on Jun. 7, 2011.

(51) Int. Cl.
*F16J 15/16* (2006.01)
*F16J 15/32* (2006.01)
*A46B 3/10* (2006.01)

(52) U.S. Cl.
CPC . *F16J 15/16* (2013.01); *A46B 3/10* (2013.01); *F16J 15/3288* (2013.01); *F05B 2240/571* (2013.01); *Y10T 74/219* (2015.01)

(58) Field of Classification Search
USPC ................................ 74/608; 277/355, 652
See application file for complete search history.

(56) References Cited

U.S. PATENT DOCUMENTS

| 4,781,388 A | 11/1988 | Wohrl et al. |
| 5,425,543 A * | 6/1995 | Buckshaw et al. ............ 277/350 |
| 6,206,629 B1 | 3/2001 | Reluzco et al. |
| 2003/0178778 A1 | 9/2003 | Szymbor et al. |

FOREIGN PATENT DOCUMENTS

EP 2290266 3/2011

* cited by examiner

*Primary Examiner* — Thomas Diaz
(74) *Attorney, Agent, or Firm* — Boyle Fredrickson S.C.

(57) ABSTRACT

A brush seal cover assembly that includes a brush cover having a shroud that substantially encloses a brush mounted in a holder without removing the holder from the equipment to which it is mounted. The assembly includes a pair of brush cover halves integrally formed to provide an outer bristle guard capable of supporting the weight of a person and a pair of brush shields on opposite sides of the brush that prevent direct impingement of pressurized gas or liquid enabling maintenance and cleaning of the equipment to be performed while leaving the brush mounted in place without damaging the brush. The cover includes a pair of mounting plates configured for mounting of the cover by clamping or by compression between fasteners without having to remove the brush holder from the equipment or the brush from the holder.

27 Claims, 3 Drawing Sheets

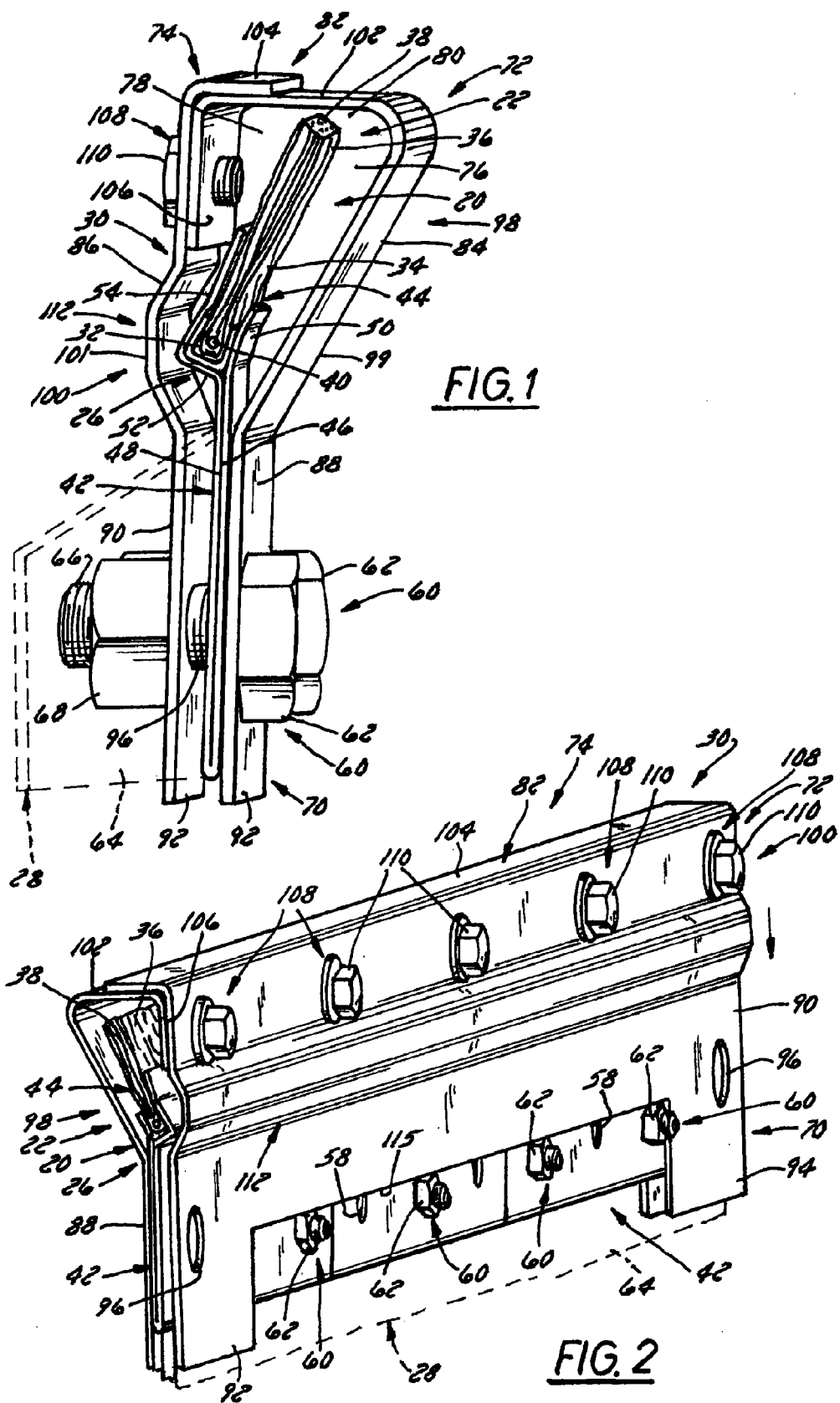

BRUSH SEAL COVER ASSEMBLY

FIELD

The present invention relates generally to a cover and more particularly to a cover assembly used to cover a brush seal while mounted in a holder of the brush seal.

BACKGROUND

Brush seals have been used in many types of commercial and industrial equipment to help provide an airtight or gas tight seal that can act as a thermal barrier that prevents heat or energy loss. A brush seal typically includes or is a brush formed of a series of filaments folded over one another and held in place by a tape or spine with the filaments extending outwardly of the tape or spine defining brush bristles whose ends or tips brush against a surface that can be moving relative to the brush to provide a seal.

Such a brush seal is an assembly that includes a brush typically mounted in a holder that is in turn rigidly attached to a piece of commercial or industrial equipment in a manner that locates each brush held by the holder in a desired sealing position. When the equipment in which a brush seal assembly is installed is taken down for maintenance, workers often need access to parts of the equipment in and around the brush seal assembly.

Quite often, the bristles of the brush of a brush seal assembly end up being exposed and vulnerable to damage by workers performing maintenance whether or not the brush itself needs replacing. Workers stepping in and around a brush seal can damages the bristles of its brush thereby necessitating premature brush replacement or, even worse, compromising the seal of the brush when the equipment is put back in operation. Just as vulnerable, however, is the holder as its integrity is necessary for maintaining proper brush seal positioning, mounting, and operation.

SUMMARY

The present invention is directed to a cover for a brush seal cover assembly that not only covers and protects the bristles of a brush of a brush seal assembly attached to a piece of equipment while undergoing maintenance, the cover protects the brush holder whether or not a brush is installed in a manner that maintains its structural integrity, preserves brush seal location, and which helps maintain brush seal integrity after operation resumes after maintenance has been completed. A brush seal cover assembly constructed in accordance with the present invention includes a brush cover having a shroud that encloses a brush of a brush seal received in a brush holder mounted to part of a piece of commercial or industrial equipment.

The brush seal cover assembly includes a pair of mounting plates having a locator edge that facilitates locating the brush cover using the fasteners that mount the brush holder to the piece of equipment. The locator edge can also provide an abutment that bears against or rests upon one or more of the brush holder mounting fasteners enabling forces encountered by the brush cover to be transferred around the brush and to the brush holder where it mounts to the piece of equipment. If desired, one or both mounting plates can include a pair of mounting arms that employ fasteners, such as one or more of the brush holder mounting fasteners, to more securely attach the brush cover to the brush holder. In another preferred embodiment, the brush cover mounting plates include brush holder fastener seating slots that receive the brush holder mounting fasteners therein with an upper edge of the slot providing an abutment edge upon which the cover is supported on the brush holder mounting fasteners and a pair of end edges of the slot locating the cover longitudinally on the brush holder and limiting side to side cover movement.

BRIEF DESCRIPTION OF THE DRAWINGS

The drawings illustrate at least one preferred embodiment presently contemplated for carrying out the invention. In the drawings:

FIG. 1 illustrates an end perspective of a brush seal cover assembly constructed in accordance with the present invention mounted to a brush holder of a brush seal assembly;

FIG. 2 illustrates a side perspective view of the brush seal cover assembly of FIG. 1 that is mounted to the brush holder of the brush seal assembly shown in FIG. 1;

Figure 3:
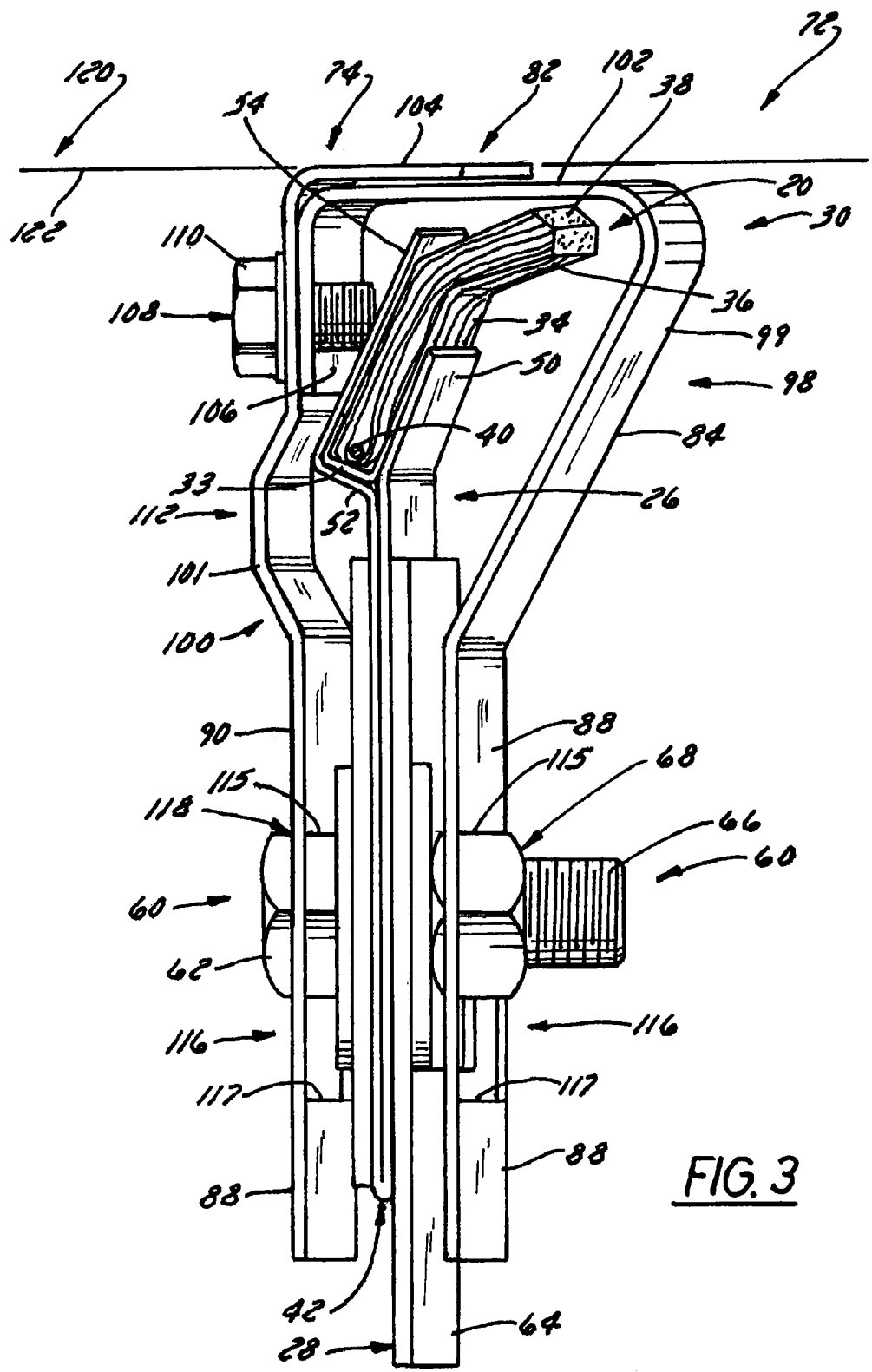
FIG. 3 is an end perspective view of another preferred embodiment of a brush seal cover assembly constructed in accordance with the present invention having a pair of seating slots that locate and facilitate mounting to a brush seal assembly.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1 and 2 illustrate a brush seal assembly 20 that includes a brush 22 that is a brush seal 24 received in a brush holder 26 that is attached to a piece of equipment 28 (shown in phantom) in which the brush 22 is used to provide a seal during operation. A brush seal cover assembly 30 constructed in accordance with the present invention is removably attached to the brush holder 26 while the brush holder 26 is attached to the piece of equipment 28 covering the brush 22 and substantially completely enclosing the holder 26 thereby permitting one or more persons, such as inspectors, maintenance workers, and the like, to move in and around the brush seal cover assembly 30 without damaging either the brush 22 or the holder 26.

With continued reference to FIGS. 1 and 2, the brush 22 is elongate having an elongate longitudinally extending tape or spine 32 of generally U-shaped cross section wrapped around or crimped around filaments 34 folded over one another that extend transversely outwardly from the tape or spine 32 defining brush bristles 36 having bristle tips or ends 38. The filaments 34 can be folded or crimped around an elongate longitudinally extending core wire 40 interiorly disposed within the tape or spine 32. The filaments 34 can be folded or crimped together with a membrane (not shown) that can be of imperforate construction that is embedded within the brush bristles 36 that can improve sealing as well as extend seal performance and life.

The brush holder 26 is substantially rigid having a mount 42 and a brush receiving channel 44 in which the tape or spine 32 of the brush 22 is received and releasably retained. The mount 42 can be formed of overlapping plates 46 and 48 having one plate 46 extending outwardly forming one brush receiving channel wall 50 and the other plate 48 configured to form a shoulder or channel end wall 52 and the other brush receiving channel wall 54. The channel walls 50 and 54 are generally parallel to one another with the channel end wall 52 extending therebetween defining a brush receiving channel 44 of generally U-shaped cross section. One or both channel end walls 50 and 54 extend alongside an adjacent portion of the bristles 36 of a brush 22 received in the channel 44 helping to support the bristles 36 while also shielding the bristles 36 from impingement of gas, dust, debris and the like during brush seal operation. Depending on which side of the brush bristles 36 encounters more impingement, one of the channel walls 50 or 54 can extend outwardly a greater or longer distance alongside bristles of the brush 22 than the other one of the channel walls 50 or 54, such as depicted in FIG. 1.

In brush sealing applications where temperatures greater than 400° Fahrenheit are encountered, at least the filaments 34 and any embedded membrane used in the brush 22 are made of a temperature resistant material with the tape or spine 32 and any core wire 40 preferably also being made of temperature resistant material. Examples of suitable temperature resistant materials from which one or more of the aforementioned brush components can be made include stainless steel, titanium, aluminum, steel, or an alloy thereof, e.g., Cor-Ten, Haynes, e.g., Haynes 25, or Inconel, e.g., Incoloy 800, Inconel 625 or Inconel 718. Such a brush 22 can be used with a holder 26 constructed in accordance with the invention in high temperature equipment, e.g., equipment 28, including turbines, e.g., steam or gas turbines, or heat exchangers, such as air preheaters and regenerative air heat exchangers, that operate at temperatures ranging from 400° Fahrenheit to as high as 1,200° Fahrenheit. Such a holder 26 can be made of temperature resistant material, such as steel, e.g., stainless steel, titanium, aluminum, a metal alloy thereof, e.g., Cor-Ten, Haynes, e.g., Haynes 25, or Inconel, e.g., Incoloy 800, Inconel 625 or Inconel 718.

The brush receiving channel 44 of the holder 26 is configured to receive and releasably yet securely retain a brush 22 mounted in the holder 26. In one preferred embodiment, one or both of the channel walls 50 and/or 54 can be formed with an inturned flange (not shown) or the like that releasably engages part of the tape or spine 32, such as an outer edge or shoulder of the tape or spine 32, preventing a brush 22 mounted in the holder 26 from being removed from the holder 26. In another preferred embodiment, one or more of the channel walls 50 and/or 54 can include integrally formed retainer tabs (not shown) that are deflectable between a brush removal position and a brush engaging position that releasably engages part of a brush 22, such as part of its tape or spine 32, to releasably retain the brush 22 in the channel 44 of the holder 26.

With continued reference to FIGS. 1 and 2, the brush holder mount 42 can be a mounting flange 56 having a plurality of pairs, i.e., at least three, of holes 58 spaced apart along substantially the entire length of the mount 42 through which fasteners 60, such as bolts 62, are used to attach the mount 42 to part 64 of the piece of equipment 28 that can be a plate, a baffle, a wall, a bracket, a housing, or another component of the equipment 28. The holes 58 in the mount 42 generally coaxially register with corresponding holes in the part 64 of the equipment 28 to which the holder 26 mounts enabling a threaded stem 66 of the bolt 62 to be inserted through the coaxially aligned holes and threadably receive a nut 68 to securely attach the holder 26 to the equipment 28 via a compression fit.

The brush seal cover assembly 30 has a mount 70 configured for removable attachment to the mount 42 of the brush holder 26 while the holder 26 is attached to the part 64, e.g. plate, housing, wall, bracket, etc. of a piece of industrial or commercial equipment 28 advantageously enabling the brush seal cover assembly 30 to cover a brush seal assembly 20 without disturbing the brush 22 mounted in the holder 26. The brush cover mount 70 carries a brush cover 72 that overlies the ends or tips 38 of the bristles 36 of a brush 22 mounted in the holder 26 and substantially encloses the opposite sides of the brush 22 substantially completely shielding the bristles 36 from being disturbed or damaged in any way during maintenance and cleaning of the equipment 28 in which the brush seal assembly 20 is mounted.

In a preferred embodiment, the brush cover 72 defines a shroud 74 contoured substantially complementarily to that of the brush 22 mounted in the holder 26 that substantially completely encloses the brush 22 preventing the brush 22 from coming into direct contact with high pressure air, high pressure water, high pressure gas, solvents, and the like during cleaning and maintenance. With reference to FIG. 1, the cover 72 is configured to provide a clearance space 76 and 78 on either side of the bristles 36 as well as a clearance space 80 outwardly of the bristle tips 38 enabling the cover 72 to be bumped, jolted, banged, or otherwise slightly displaced without contacting the bristles 36.

The cover 72 has an outer bristle guard 82 that can be flat or generally planar to enable a maintenance worker, inspector or another person to step directly on the guard 82 without the guard 82 deforming under the weight of the person and contacting any of the bristles 36 of a brush 22 mounted in the holder 26. The cover 72 includes a pair of spaced apart brush shields 84 and 86 that can be inclined at an angle substantially complementarily to bristles 36 of a brush 22 mounted in the holder 26. One or both brush shields 84 and/or 86 can also be angled to direct any pressurized stream of gas or liquid away from the brush bristles 36 preventing direct contact from occurring.

The brush seal cover assembly 30 has a generally U-shaped cross section having a cover 72 that can be bulbous to provide clearance space around a brush 22 mounted in the brush holder 26 and a mount 70 formed of a pair of spaced apart mounting plates 88 and 90 disposed on opposite sides of the brush holder mount 42 that engage the brush holder mount 42 in a manner that releasably yet securely attaches the cover 72 to the holder 26. In one embodiment, the brush shields 84 and 86 converge inwardly from the bristle guard 82 toward the brush holder mount 42 producing a brush cover mount 70 with its mounting plates 88 and 90 urged, such as by being spring biased, together in a manner that bears against respective sides of the brush holder mount 42 in a manner that helps retain the brush cover 70 on the brush holder 26.

In one preferred embodiment, such as depicted in FIG. 2, the brush cover 72 is configured so the mounting plates 88 and 90 apply a clamping pressure against the brush holder mount 42 that can be enough to hold the cover 72 in place without the use of any fasteners. In another preferred embodiment, such as depicted in FIG. 1, the mounting plates 88 and 90 of the cover 72 can each include a pair of spaced apart mounting arms 92 and 94 having an opening 96 formed therein through which a fastener can extend that is used to attach both arms 92 and 94 and preferably both mounting plates 88 and 90 to the brush holder mount 42 via a secure compression fit. For example, as shown in FIG. 1, a pair of the fasteners 60 used to mount the brush holder 26 to part 64 of the equipment 28 can be removed and used to attach both arms 92 and 94 of both mounting plates 88 and 90 of the brush cover 72 to the brush holder mount 42. When this is done, the remaining fasteners 62 attaching the brush holder 26 to part 64 of the equipment 28 remain in place enabling the brush cover 72 to be mounted to the holder 26 without removing either the holder 26 or the brush 22.

In one preferred brush cover embodiment, the brush seal cover assembly 30 is formed of a pair of plates with one of the plates being a brush cap 98 and the other one of the plates being a clamp bracket 100 that collectively define brush cover halves that form the brush shroud 74 that covers the bristles 36 of the brush 22 as well as that part of the holder 26 that receives and retains the spine or tape of the brush 22 therein. Shroud 74 substantially encloses the brush 22 and brush-receiving channel 44 of the brush holder 26 in a manner that prevents direct impingement of water or gas used during industrial equipment cleaning thereby protecting the brush 22 during maintenance and cleaning of the industrial equipment in which the brush 22 and brush holder 26 is mounted. Such a brush cover assembly 30 advantageously protects the brush 22 and brush holder 26 during maintenance and cleaning in a manner that retains the existing orientation or alignment of the brush 22 in the holder 26.

The brush cap 98 has a generally horizontal top cover wall 102 that overlies the ends 38 of the bristles 36 of the brush 22 and forms part of the bristle guard 82 that provides a support surface capable of allowing a person to walk on the brush cover assembly 30 without coming into contact with any part of the brush 22 covered thereby. The brush cap 98 has a leg 99 that extends generally downwardly from the top cover wall 102 that forms one brush shield 84 that extends alongside the bristles 36 of the brush 22 and which can be acutely angled relative to the top cover wall 102 at an angle that is generally parallel to the angle of inclination of the brush 22. The brush cap 98 also has a generally downwardly clamping flange that forms one of the mounting plates 88 that extends alongside part of the brush holder mount 42 and which can include a pair of spaced apart mounting arms 92 and 94.

Each arm 92 and 94 can include a hole 96 that receives a fastener 60 that can be used to help attach at least the brush cap 98 to part of the brush holder mount 42 and/or a portion of the industrial equipment, e.g., regenerative air pre-heater basket, to which the brush holder 26 is attached. In a preferred embodiment and method of use, the brush cover mounting arms 92 and 94 are spaced apart a distance that permits one arm 92 to be disposed on one side of a plurality of bolts 62 used to mount the brush holder 26 to part 64 of the industrial equipment 28 and that permits the other arm 94 to be disposed on the other side of the plurality of the brush holder mounting bolts 62 thereby enabling the brush cap 98 to be securely and positively placed over part of the brush 22 and brush holder 26 without having to remove all of the mounting bolts 62 used to mount the brush holder 26 to part 64 of the industrial equipment 28 in which the brush 22 is used to provide a seal during industrial equipment operation.

The generally L-shaped clamp bracket 100 has a generally horizontally extending flange 104 that overlaps a portion of the generally horizontal top cover wall 102 of the brush cap 98 helping to more uniformly spread out forces such as from a person stepping on the bristle guard 82 when the bristle guard 82 is functioning as a step. The clamp bracket 100 has a generally downwardly extending sidewall 101 that forms the other brush shield 86 with a portion of the shield 86 overlapping a downturned flange 106 of the brush cap 98 where cap fasteners 108, such as bolts 110, are used to attach the brush cap 98 to the clamp bracket 100. The clamp bracket sidewall 101 can be formed to include an outwardly extending brush holder clearance channel 112 that extends around and encloses brush receiving channel 44 of the brush holder 26 in which the brush 22 seats.

In a method of attachment, one of the brush cover halves 98 and 100 can be disposed with its respective mounting plate 88 or 90 in abutment with one side of the brush holder mount 42 and its mounting arms 92 and 94 straddling a plurality of the brush holder mounting bolts 62 thereby helping to locate the corresponding brush cover half relative to the brush holder 26 to which the brush cover is being mounted. The one of the brush cover halves 98 and 100 is disposed with its respective mounting plate 88 or 90 in abutment with the other side of the brush holder mount 42 with its mounting arms 92 and 94 also straddling a plurality of the brush holder mounting fasteners 60. A plurality of cap fasteners 108 are used to attach the cover halves 98 and 100 thereby also helping clamp brush cover mounting plates against opposite sides of the brush holder mount 42. When mounted to the brush holder 26, a bottom edge 115 of each mounting plate 88 and 90 rests on or abuts the fasteners 60 used to attach the holder 26 to part 64 of the equipment 28 thereby enabling forces encountered by the brush cover to be transferred to the holder 26. In resting on the brush holder mounting fasteners 60 in this manner, the edge 115 serves as a locator and the mounting plates 88 and 90 as spacers that space the cover, including the shroud, from the holder mount 42 so as to maintain a desired clearance or clearances 78, 80 and/or 76 around the brush 22 in the holder 26 even when the brush cover is stepped on by a person. Where additional mounting force is needed, fasteners 60 can be used to attach each mounting arm 92 and 94 of each mounting plate to each other and the brush holder mount 42 via compression fit.

Figure 4:
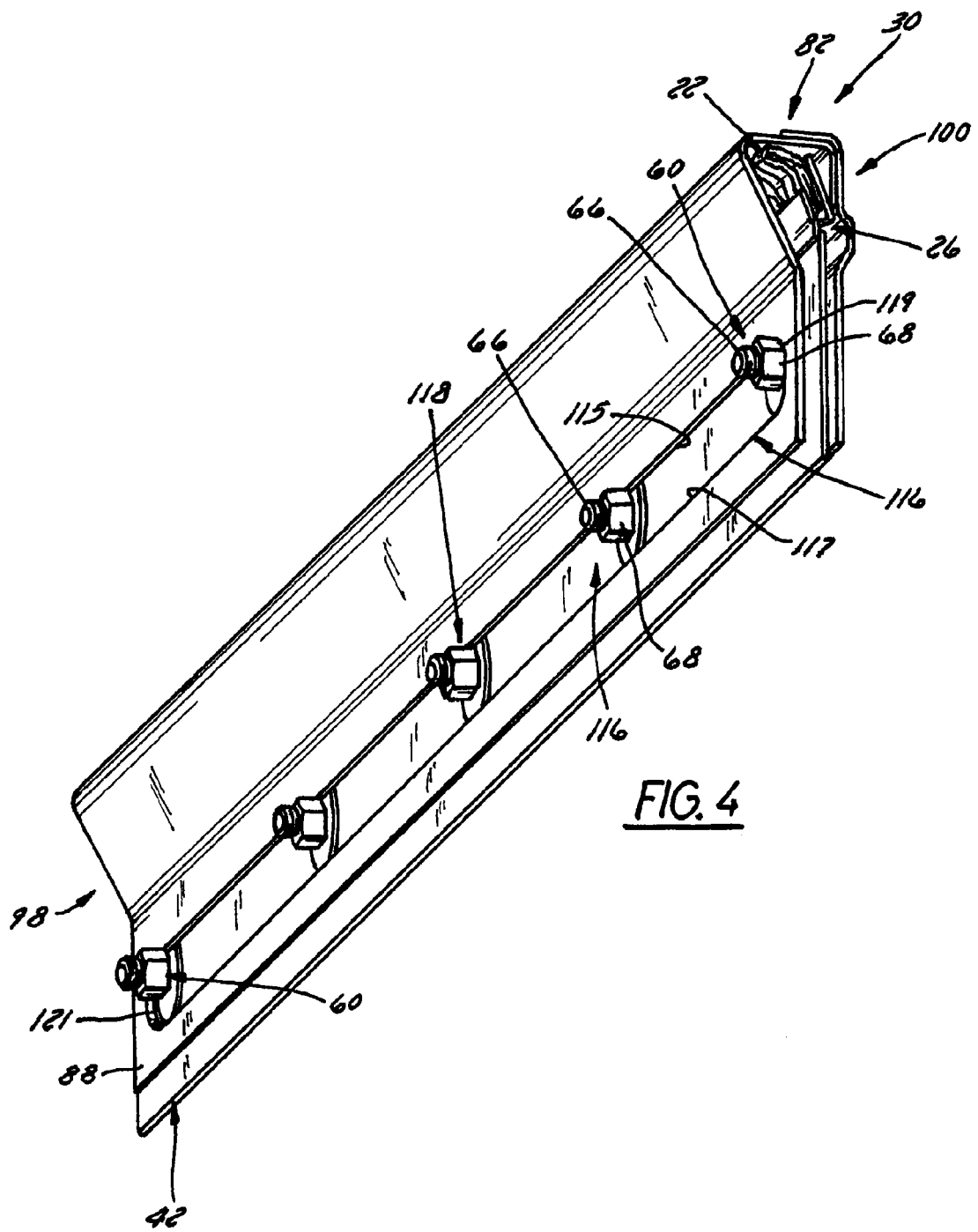
FIG. 4 is a side perspective view of the brush seal cover assembly of FIG. 3.

FIGS. 3 and 4 illustrate another preferred embodiment of a brush seal cover assembly 30 constructed in accordance with the present invention having an elongate slot 116 formed in each mounting plate 88 and 90 that forms a mounting seat 118 that receives a plurality of the brush holder mounting fasteners 60 used to mount the brush holder 26 to part 64 of the equipment 28 in which the brush seal assembly 20 is used to provide a seal. Each slot 116 is defined by a pair of spaced apart upper and lower edges 115 and 117 that are spaced apart from each other by a distance greater than the greatest or largest extent or width of the fasteners 60 used to mount the brush holder 26 to part 64 of the equipment 28 enabling the fasteners 60 to be quickly and easily seated in the slot during brush cover assembly and/or mounting.

In the preferred embodiment shown, at least the upper slot edge 115 is substantially straight and acts as an abutment upon which bears an adjacent portion of the brush holder mounting fasteners 60. For example, one upper slot edge 115 of one of the brush cover mounting plates 88 rests on and abuts the nuts 68 of the brush holder mounting fasteners 60 on one side and the upper slot edge 115 of the other one of the brush cover mounting plates 90 rests on and abuts the head of the bolts 62 of the brush holder mounting fasteners 60. If desired, although not preferred, the upper slot edge 115 of the slot 116 in the mounting plate 88 or 90 that seats over the stems 66 and nuts 68 of the brush holder mounting fasteners 116 can rest upon or abut against the stems 66 when attachment of the brush cover assembly 30 is completed.

Such an arrangement of brush cover seating slots 116 advantageously enable a brush cover constructed in accordance with the present invention to be vertically and horizontally located about the brush holder mounting fasteners 60 to properly vertically and horizontally locate the brush cover enclosing the brush 22 in the holder 26. In horizontally locating the brush cover assembly 30 on a brush seal assembly 20, the end edges 119 and 121 seat adjacent or against respectively outermost brush holder fasteners 60 also limiting horizontal side to side movement of the brush cover assembly 30 relative to the brush seal assembly 20 when mounted thereto. Such an arrangement of brush cover seating slots 116 also advantageously enables the brush cover to be quickly yet securely mounted with forces encountered by the brush cover being transferred via engagement between the top edge to the brush holder 26 around and away from the brush 22 mounted in the holder 26.

As is depicted in FIG. 3, in one preferred embodiment, the brush seal cover assembly 30 is mounted to the brush holder 26 of a brush seal assembly 20 used in a piece of industrial equipment 28 that is a regenerative air preheater having a sector plate 120 with a sector plate edge 122 with the brush cover assembly 30 attached to the brush seal assembly 20 in a manner where the top surface of the brush guard or step 82 is substantially flush with the sector plate edge 122 to help provide a walking surface for a worker walking between the sector plate 120 and the brush cover assembly 30 that is substantially even and unobstructed.

The present invention is directed to a brush cover assembly for a brush seal assembly comprising a protective cover overlying a brush of a brush seal received in a brush holder and a mount that removably mounts to the holder. The brush cover assembly wherein the mount comprises a pair of mounting plates each having an edge that abuts a plurality of fasteners used to attach the brush holder to a piece of equipment. The brush wherein each mounting plate straddles opposite sides of the brush holder and has an elongate slot formed therein. The brush cover assembly wherein the slot of each mounting plate has a pair of end edges that locate the cover longitudinally relative to the brush holder. The brush cover assembly wherein each mounting plate straddles opposite sides of the brush holder and has a pair of arms disposed on opposite sides of a plurality of fasteners used to attach the brush holder to a piece of equipment. The brush cover assembly wherein the arms have inner edges that locate the cover longitudinally relative to the brush holder. The brush cover assembly wherein each arm has an opening for receiving a brush holder mounting fastener to mount the cover to the brush holder. The brush cover assembly wherein the protective cover is comprised of a pair of halves that form a shroud with a brush bristle guard that provides a step upon which a person can step. The brush cover assembly wherein the protective cover is comprised of a pair of brush cover halves that overlap adjacent bristles of the brush received in the brush holder. The brush cover assembly wherein the brush cover halves are joined together by a plurality of fasteners where the cover halves overlap. The brush cover assembly herein the mount comprises a pair of mounting plates configured to releasably attach the protective cover to the brush holder without removing the brush from the brush holder. The brush cover assembly wherein the mount comprises a pair of mounting plates each having a seating slot formed therein that mounts the protective cover to the brush holder without removing the brush holder from a piece of equipment to which the brush holder is attached. The brush cover assembly wherein the mount comprises a pair of mounting plates each having an abutment edge formed therein used in mounting the protective cover to the brush holder without removing the brush holder from a piece of equipment to which the brush holder is attached. The brush cover assembly wherein the abutment edge extends longitudinally relative to a longitudinal extent of the brush holder upon which fasteners used to attach the brush holder to a piece of equipment abut.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention

What is claimed is:

1. A brush cover assembly for covering and protecting a brush seal assembly having a brush of a brush seal received in a brush holder having a brush holder mount attached to a piece of equipment, the brush cover assembly comprising a protective brush cover overlying the brush of the brush seal received in the brush holder, and a protective brush cover mount that removably mounts to a portion of the brush holder, and wherein the protective brush cover provides a step on which a person can step, and wherein the protective brush cover mount comprises a pair of brush cover mounting plates with at least one of the brush cover mounting plates having an edge that abuts a plurality of fasteners used to attach the brush holder to the piece of equipment.

2. The brush cover assembly of claim 1 wherein one of the brush cover mounting plates is disposed alongside one side of the brush holder and the other one of the brush cover mounting plates is disposed alongside an opposite side of the brush holder straddling opposite sides of the brush holder, and wherein the abutting edge of the at least one of the brush cover mounting plates rests on a plurality of the brush holder mounting fasteners supporting the protective brush cover thereon.

3. The brush cover assembly of claim 1 wherein the abutting edge of the at least one of the brush cover mounting plates extends longitudinally therealong defining part of a slot that receives a plurality of the brush holder mounting fasteners, the slot formed in the at least one of the brush cover mounting plates with the abutting edge extending between a pair of end edges of the slot that locate the protective brush cover longitudinally relative to the brush holder when the plurality of the brush holder mounting fasteners are received in the slot.

4. The brush cover assembly of claim 1 wherein one of the brush cover mounting plates is disposed alongside one side of the brush holder and the other one of the brush cover mounting plates is disposed alongside an opposite side of the brush holder, and wherein the abutting edge is elongate and extends longitudinally between a pair of arms that bracket the plurality of brush holder mounting fasteners against which the abutting edge abuts.

5. The brush cover assembly of claim 4 wherein the plurality of brush holder mounting fasteners are disposed between the arms locating the protective brush cover longitudinally relative to the brush holder.

6. The brush cover assembly of claim 4 wherein each arm has an opening for receiving a brush holder mounting fastener to mount the protective brush cover to the brush holder.

7. The brush cover assembly of claim 1 wherein the protective brush cover is comprised of a pair of halves that form a shroud surrounding the brush received in the brush holder, the shroud having a brush bristle guard overlying bristle ends of the brush received in the brush holder, the bristle guard defining the step upon which a person can step.

8. The brush cover assembly of claim 7 wherein one of the halves of the shroud of the protective brush cover extends along one side of the brush holder mount defining at least a portion of the protective brush cover mount.

9. The brush cover assembly of claim 1 wherein the protective brush cover is comprised of a pair of brush cover halves that overlap one another adjacent bristles of the brush received in the brush holder.

10. The brush cover assembly of claim 9 wherein the brush cover halves are joined together by a plurality of fasteners where the brush cover halves overlap.

11. The brush cover assembly of claim 1 wherein at least one of the brush cover mounting plates extending alongside the brush holder having a seating slot formed therein that mounts the protective brush cover to the brush holder without removing the brush holder from the piece of equipment to which the brush holder is attached, and wherein said plurality of fasteners used to attach the brush holder to the piece of equipment are received in the seating slot and extend outwardly thereof.

12. A brush cover assembly for covering and protecting a brush seal assembly having a brush of a brush seal received in a brush holder having a brush holder mount attached to a piece of equipment, the brush cover assembly comprising a protective brush cover overlying the brush of the brush seal received in the brush holder, and a protective brush cover mount that removably mounts to a portion of the brush holder, and wherein the protective brush cover provides a step on which a person can step, wherein the protective brush cover mount comprises a brush cover mounting plate extending alongside the brush holder mount with the brush cover mounting plate having an elongate longitudinally extending locator edge extending alongside a plurality of spaced apart fasteners used to attach the brush holder mount to the piece of equipment locating the protective brush cover relative to bristles of the brush received in the brush holder.

13. The brush cover assembly of claim 12 wherein the locator edge extends between a pair of spaced apart outwardly extending locator arms with the plurality of fasteners disposed in between the locator arms longitudinally locating the protective brush cover relative to the brush holder mount.

14. The brush cover assembly of claim 13 wherein the locator edge and locator arms are defined by an elongate longitudinally extending locator slot formed in the brush cover mounting plate, and wherein the plurality of fasteners used to attach the brush holder to the piece of equipment are received in the locator slot and extend outwardly from the locator slot.

15. The brush cover assembly of claim 13 wherein the protective brush cover mount is comprised of a pair of brush cover mounting plates with one of the brush cover mounting plates extending alongside one side of the brush holder mount and the other one of the brush cover mounting plates extending alongside the other side of the brush holder mount.

16. The brush cover assembly of claim 15 wherein each one of the brush cover mounting plates has a longitudinally extending locator edge extending between a pair of spaced apart locator arms.

17. The brush cover assembly of claim 12 wherein the protective brush cover mount is comprised of a pair of generally parallel brush cover mounting plates with one of the brush cover mounting plates extending alongside one side of the brush holder mount and the other one of the brush cover mounting plates extending alongside the other side of the brush holder mount.

18. The brush cover assembly of claim 17 wherein each one of the brush cover mounting plates has a longitudinally extending locator edge.

19. The brush cover assembly of claim 12 wherein the longitudinally extending locator edge is substantially straight and rests on the plurality of fasteners used to attach the brush holder mount to the piece of equipment supporting the protective brush cover thereon.

20. A brush cover assembly for covering and protecting a brush seal assembly having a brush of a brush seal received in a brush holder and attached by a brush holder mount to a piece of equipment using a plurality of fasteners spaced apart longitudinally along the brush holder mount, the brush cover assembly comprising a protective brush cover having (a) a shroud covering bristles of the brush of the brush seal received in the brush holder, and (b) a brush cover mount extending alongside the brush holder mount that attaches the protective brush cover thereto, the brush cover mount having an elongate longitudinally extending locator edge extending alongside a plurality of the longitudinally spaced apart fasteners used to attach the brush holder mount to the piece of equipment locating the protective brush cover relative to the brush covered by the protective brush cover.

21. The brush cover assembly of claim 20 wherein the brush cover mount is comprised of a pair of spaced apart brush cover mounting plates straddling the brush holder mount.

22. The brush cover assembly of claim 21 wherein each one of the brush cover mounting plates extends outwardly from the brush holder mount alongside a corresponding side of the brush with the brush cover mounting plates converging adjacent the ends of bristles of the brush to form the shroud of the protective brush cover.

23. The brush cover assembly of claim 22 wherein the shroud comprises a step upon which a person can step without contacting the brush covered by the protective brush cover.

24. The brush cover assembly of claim 22 wherein the protective brush cover is comprised of a pair of brush cover halves attached at or adjacent the bristles of the brush forming the shroud.

25. The brush cover assembly of claim 24 wherein a portion of one of the brush cover halves overlaps a portion of the other one of the brush cover halves engaging one another therealong.

26. The brush cover assembly of claim 22 wherein the locator edge abuts against the plurality of the longitudinally spaced apart fasteners used to attach the brush holder mount to the piece of equipment supporting the protective brush cover on the plurality of the longitudinally spaced apart fasteners.

27. The brush cover assembly of claim 22 wherein the pair of brush cover mounting plates clamp the brush holder mount therebetween.

* * * * *